(12) United States Patent
Johnsen et al.

(10) Patent No.: US 9,563,682 B2
(45) Date of Patent: Feb. 7, 2017

(54) SYSTEM AND METHOD FOR SUPPORTING CONFIGURATION DAEMON (CD) IN A NETWORK ENVIRONMENT

(71) Applicant: Oracle International Corporation, Redwood Shores, CA (US)

(72) Inventors: Bjørn Dag Johnsen, Oslo (NO); Prabhunandan Narasimhamurthy, Redwood Shores, CA (US); Line Holen, Fetsund (NO)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 252 days.

(21) Appl. No.: 13/892,129

(22) Filed: May 10, 2013

(65) Prior Publication Data

US 2013/0304699 A1    Nov. 14, 2013

Related U.S. Application Data

(60) Provisional application No. 61/645,517, filed on May 10, 2012.

(51) Int. Cl.
*G06F 17/30* (2006.01)
*H04L 12/24* (2006.01)
(Continued)

(52) U.S. Cl.
CPC ......... *G06F 17/30575* (2013.01); *H04L 41/00* (2013.01); *H04L 41/046* (2013.01);
(Continued)

(58) Field of Classification Search
CPC ...... H04L 41/0806; H04L 41/00; H04L 41/24; H04L 41/046; H04L 41/0873; H04L 63/20; H04L 63/061; H04L 49/358; G06F 17/30575
See application file for complete search history.

(56) References Cited

U.S. PATENT DOCUMENTS 5,758,083 A * 5/1998 Singh et al. .................. 709/223
6,012,100 A * 1/2000 Frailong ............... H04L 41/082
                                                    709/220
(Continued)

FOREIGN PATENT DOCUMENTS

CN    1514625    7/2004
CN    1520556    8/2004
(Continued)

OTHER PUBLICATIONS

Shanley, Tom, Infiniband Network Architecture (excerpt), Pearson Education, published 2002, p. 209-211, 393-394, 551, 554.
(Continued)

*Primary Examiner* — Shiow-Jy Fan
(74) *Attorney, Agent, or Firm* — Tucker Ellis LLP

(57) ABSTRACT

A system and method can support network management in a network environment. The network environment can include a plurality of configuration daemons (CDs), wherein a master CD is an active CD on a switch with a master subnet manager (SM). The master CD operates to perform consistency check on one or more states associated with one or more peer CDs in the network environment, and replicate a configuration file to the one or more peer CDs, wherein the configuration file includes at least one management key (M_Key) value.

17 Claims, 8 Drawing Sheets

(51) Int. Cl.
*H04L 12/26* (2006.01)
*H04L 29/06* (2006.01)
*H04L 12/931* (2013.01)
*H04L 29/08* (2006.01)

(52) U.S. Cl.
CPC ...... *H04L 41/0806* (2013.01); *H04L 41/0873* (2013.01); *H04L 41/24* (2013.01); *H04L 43/00* (2013.01); *H04L 49/358* (2013.01); *H04L 63/061* (2013.01); *H04L 63/20* (2013.01); *H04L 67/1051* (2013.01)

(56) References Cited

U.S. PATENT DOCUMENTS

| | | | |
|---|---|---|---|
| 6,098,098 A * | 8/2000 | Sandahl et al. | 709/221 |
| 6,282,678 B1 | 8/2001 | Snay | |
| 6,286,038 B1 * | 9/2001 | Reichmeyer | H04L 41/0213 709/220 |
| 6,314,531 B1 | 11/2001 | Kram | |
| 6,343,320 B1 * | 1/2002 | Fairchild et al. | 709/224 |
| 6,658,579 B1 * | 12/2003 | Bell et al. | 713/400 |
| 6,697,360 B1 | 2/2004 | Gai | |
| 6,772,320 B1 | 8/2004 | Raj | |
| 6,941,350 B1 | 9/2005 | Frazier | |
| 6,981,025 B1 | 12/2005 | Frazier et al. | |
| 7,023,795 B1 | 4/2006 | Hwu | |
| 7,113,995 B1 | 9/2006 | Beukema et al. | |
| 7,290,277 B1 | 10/2007 | Chou et al. | |
| 7,398,394 B1 | 7/2008 | Johnsen et al. | |
| 7,409,432 B1 | 8/2008 | Recio et al. | |
| 7,437,447 B2 | 10/2008 | Brey et al. | |
| 7,493,409 B2 | 2/2009 | Craddock et al. | |
| 7,577,996 B1 | 8/2009 | Merchant | |
| 7,636,772 B1 * | 12/2009 | Kirby et al. | 709/221 |
| 7,721,324 B1 | 5/2010 | Jackson | |
| 7,860,006 B1 | 12/2010 | Kashyap et al. | |
| 8,327,437 B2 | 12/2012 | McAlister | |
| 8,331,381 B2 | 12/2012 | Brown et al. | |
| 8,549,281 B2 | 10/2013 | Samovskiy et al. | |
| 8,645,524 B2 | 2/2014 | Pearson | |
| 2002/0016858 A1 | 2/2002 | Sawada et al. | |
| 2002/0059597 A1 | 5/2002 | Kikinis et al. | |
| 2002/0133620 A1 * | 9/2002 | Krause | 709/238 |
| 2003/0005039 A1 | 1/2003 | Craddock | |
| 2003/0105914 A1 | 6/2003 | Dearth et al. | |
| 2004/0013088 A1 | 1/2004 | Gregg | |
| 2004/0028047 A1 | 2/2004 | Hou et al. | |
| 2004/0037279 A1 | 2/2004 | Zelig | |
| 2004/0078709 A1 | 4/2004 | Beukema | |
| 2004/0103282 A1 | 5/2004 | Meier et al. | |
| 2004/0168089 A1 | 8/2004 | Lee | |
| 2005/0071709 A1 | 3/2005 | Rosenstock | |
| 2005/0100033 A1 | 5/2005 | Arndt | |
| 2005/0108434 A1 | 5/2005 | Witchey | |
| 2005/0198250 A1 | 9/2005 | Wang | |
| 2005/0213608 A1 | 9/2005 | Modi | |
| 2005/0273641 A1 | 12/2005 | Sandven et al. | |
| 2006/0215673 A1 | 9/2006 | Olvera-Hernandez | |
| 2006/0230219 A1 | 10/2006 | Njoku | |
| 2007/0022479 A1 | 1/2007 | Sikdar et al. | |
| 2007/0038703 A1 | 2/2007 | Tendjoukian et al. | |
| 2007/0058657 A1 | 3/2007 | Holt | |
| 2007/0073882 A1 | 3/2007 | Brown | |
| 2007/0140266 A1 | 6/2007 | Njoku | |
| 2007/0162520 A1 | 7/2007 | Petersen et al. | |
| 2007/0180497 A1 | 8/2007 | Popescu | |
| 2007/0198656 A1 | 8/2007 | Mazzaferri et al. | |
| 2007/0280104 A1 | 12/2007 | Miyoshi | |
| 2007/0294405 A1 | 12/2007 | Mohindra | |
| 2008/0137528 A1 | 6/2008 | O'Toole et al. | |
| 2008/0250125 A1 | 10/2008 | Brey et al. | |
| 2008/0267183 A1 | 10/2008 | Arndt | |
| 2008/0301256 A1 | 12/2008 | McWilliams et al. | |
| 2009/0073895 A1 | 3/2009 | Morgan et al. | |
| 2009/0080328 A1 | 3/2009 | Hu | |
| 2009/0234974 A1 | 9/2009 | Arndt | |
| 2010/0054129 A1 | 3/2010 | Kuik | |
| 2010/0138532 A1 | 6/2010 | Glaeser et al. | |
| 2010/0146093 A1 | 6/2010 | Kuik | |
| 2010/0228961 A1 | 9/2010 | Burns et al. | |
| 2011/0023108 A1 | 1/2011 | Geldermann et al. | |
| 2011/0131447 A1 | 6/2011 | Prakash et al. | |
| 2012/0291028 A1 | 11/2012 | Kidambi | |
| 2012/0314706 A1 | 12/2012 | Liss | |
| 2013/0036136 A1 * | 2/2013 | Horii | 707/770 |
| 2013/0077492 A1 | 3/2013 | Scaglione | |

FOREIGN PATENT DOCUMENTS

| | | |
|---|---|---|
| CN | 1536842 | 10/2004 |
| CN | 1617526 | 5/2005 |
| EP | 2160068 A1 | 3/2010 |
| WO | 2012037518 | 3/2012 |

OTHER PUBLICATIONS

International Search Report dated Sep. 26, 2013 for Application No. PCT/US2013/040656, 10 pages.
International Search Report dated Sep. 23, 2013 for Application No. PCT/US2013/040639, 10 pages.
Lee, M., Security Enhancement in Infiniband Architecture, IEEE, vol. 19, Apr. 2005, pp. 1-18.
Shanley, Tom, "Infiniband Network Architecture" (excerpt), Pearson Education, Copyright © 2002 by MindShare, Inc., published Oct. 2002, p. 204-209, 560-564.
Search Report from State Intellectual Property Office of the People's Republic of China for Application No. 201280030334.2 dated Aug. 21, 2015, 2 pages.
Tom Shanley, Infiniband Network Architecture (excerpt), Pearson Education, Published 2002, p. 213.
State Intellectual Property Office of the People's Republic of China, Search Report, Office Action Dated June 1, 2016 for Chinese Patent Application No. 201380014177.0, 8 Pages.
Shanley, Tom, "Infiniband Network Architecture" (Excerpt), Copyright 2002 by Mindshare, Inc., p. 86-87.
United States Patent and Trademark Office, Notice of Allowance and Fee(s) Due for U.S. Appl. No. 13/892,174 Dated Oct. 5, 2016, 9 pages.

* cited by examiner

SYSTEM AND METHOD FOR SUPPORTING CONFIGURATION DAEMON (CD) IN A NETWORK ENVIRONMENT

CLAIM OF PRIORITY

This application claims priority on U.S. Provisional Patent Application No. 61/645,517, entitled "SYSTEM AND METHOD FOR PROVIDING SECRET MANAGEMENT KEY IN A MIDDLEWARE MACHINE ENVIRONMENT" filed May 10, 2012, which application is herein incorporated by reference.

CROSS REFERENCE TO RELATED APPLICATIONS

This application is related to the following patent applications, each of which is hereby incorporated by reference in its entirety:

U.S. Patent Application entitled "SYSTEM AND METHOD FOR PROVIDING A TRANSACTIONAL COMMAND LINE INTERFACE (CLI) IN A NETWORK NETWORK", application Ser. No. 13/892,122, filed May 10, 2013;

U.S. Patent Application entitled "SYSTEM AND METHOD FOR SUPPORTING STATE SYNCHRONIZATION IN A NETWORK ENVIRONMENT", application Ser. No. 13/892,133, filed May 10, 2013;

U.S. Patent Application entitled "SYSTEM AND METHOD FOR SUPPORTING PERSISTENT SECURE MANAGEMENT KEY (M_KEY) IN A NETWORK ENVIRONMENT", application Ser. No. 13/892,152, filed May 10, 2013;

U.S. Patent Application entitled "SYSTEM AND METHOD FOR SUPPORTING SUBNET MANAGER (SM) MASTER NEGOTIATION IN A NETWORK ENVIRONMENT", application Ser. No. 13/892,162, filed May 10, 2013; and U.S. Patent Application entitled "SYSTEM AND METHOD FOR SUPPORTING A DRY-RUN MODE IN A NETWORK ENVIRONMENT", application Ser. No. 13/892,174, filed May 10, 2013.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software, and is particularly related to supporting a network environment.

BACKGROUND

The interconnection network plays a beneficial role in the next generation of super computers, clusters, and data centers. High performance network technology, such as the InfiniBand (IB) technology, is replacing proprietary or low-performance solutions in the high performance computing domain, where high bandwidth and low latency are the key requirements.

Due to its low latency, high bandwidth, and efficient utilization of host-side processing resources, IB technology has been gaining acceptance within the High Performance Computing (HPC) community as a solution to build large and scalable computer clusters.

SUMMARY

Described herein are systems and methods for supporting subnet management in a network environment. The network environment can include a plurality of configuration daemons (CDs), wherein a master CD is an active CD on a switch with a master subnet manager (SM). The master CD operates to perform consistency check on one or more states associated with one or more peer CDs in the network environment, and replicate a configuration file to the one or more peer CDs, wherein the configuration file includes at least one management key (M_Key) value.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the Infiniband (IB) network as an example for a high performance network. It will be apparent to those skilled in the art that other types of high performance networks can be used without limitation.

Described herein are systems and methods that can support subnet management in a network, such as an IB network.

InfiniBand (IB) Network and Management Key (M_Key) Protection Model

The IB networks can be referred to as subnets. An IB subnet can include a set of hosts interconnected using switches and point-to-point links. Additionally, the IB subnet can include at least one subnet manager (SM), which is responsible for initializing and bringing up the network, including the configuration of all the switches, routers and host channel adaptors (HCAs) in the subnet.

Figure 1:
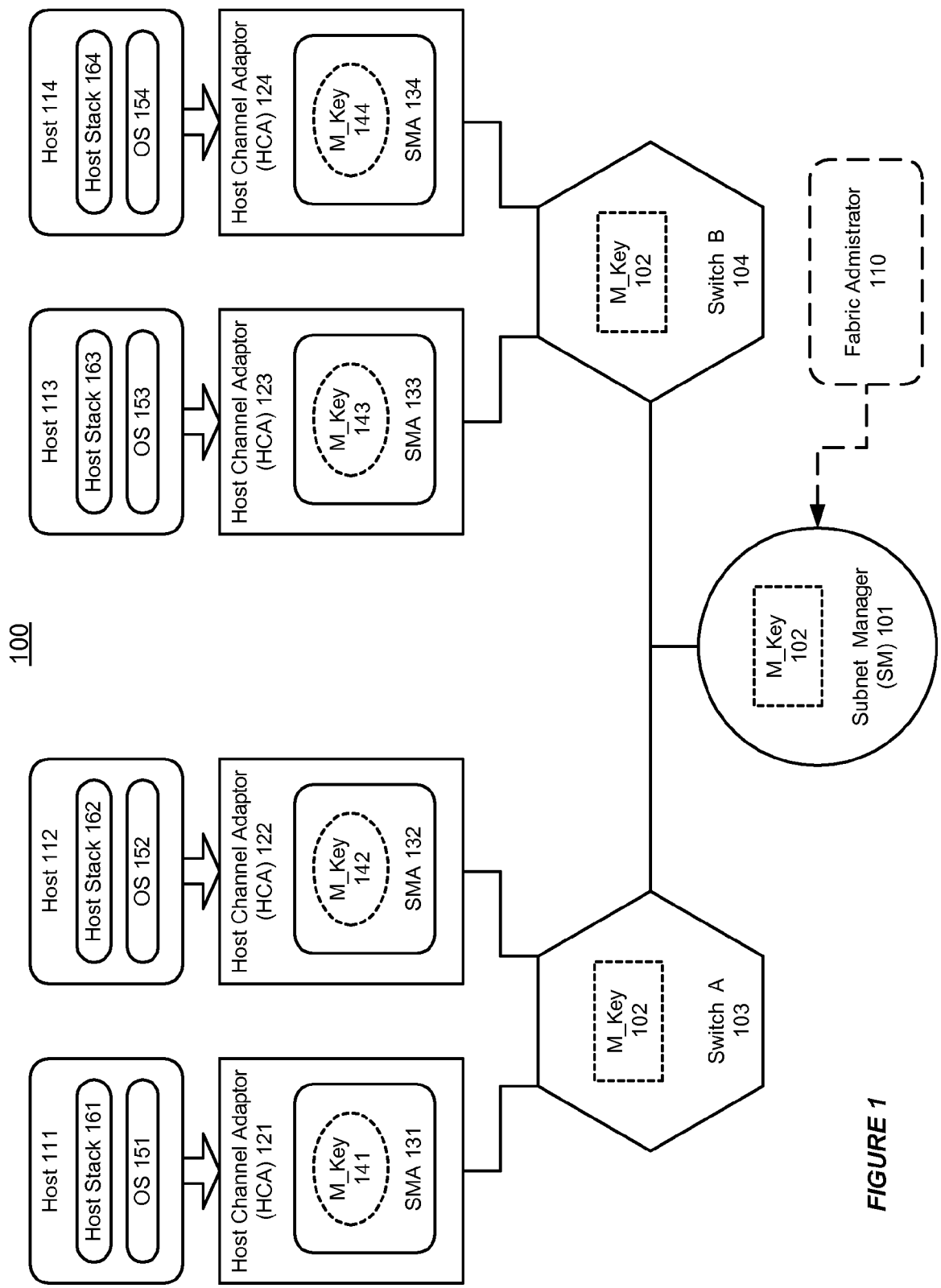
FIG. 1 shows an illustration for supporting a management key (M_Key) protection model in an IB network, in accordance with an embodiment of the invention.

FIG. 1 shows an illustration of supporting a management key (M_Key) protection model in an IB network, in accordance with an embodiment of the invention. As shown in FIG. 1, a management key, such as an M_Key 102, can be used to protect an IB fabric, such as an IB subnet 100. The values for the M_Key 102 may only be known by fabric administrators 110, which can have administrator access to the switches A-B 103-104 and the designated subnet manager (SM) nodes 101.

In the IB subnet 100, a secure HCA firmware implementation in HCA 121-124 can keep the type and identity of various fabric nodes well defined. Each of the HCA 121-124 can implement a subnet management agent (SMA) component, e.g. SMAs 131-134. Each of the SMAs 131-134 can be associated with an M_Key, e.g. M_Keys 141-144.

Furthermore, the connected switches A-B 103-104 can be controlled by the fabric administrator 110, which can install new M_Key values 102, out-of-band, on switches 103-104. Thus, any rogue SMA implementation 131-134 may not compromise the fabric administrator 110 defined M_Key 102 values that are used in the IB subnet/fabric 100.

Additionally, the fabric administrator 110 can ensure that there is infinite M_Key 102 lease time on the switches A-B 103-104. Thus, the host based software 161-164, e.g. a host based subnet manager on different hosts 111-114 (including an operating system 151-154), may not hijack the control of any switch A-B 103-104 in the IB subnet/fabric 100.

In accordance with an embodiment of the invention, a single M_Key 102 value (or a single set of M_Key values) can be used for various nodes in the in the IB subnet 100 based on the IB specification defined access restrictions. The correct value for a current M_Key 102 may need to be specified before either reading or updating the M_Key 102, since the secure HCA firmware can ensure that the "read protected" M_Key assigned to the local HCA 121-124 is not exposed to local host based software.

In accordance with an embodiment of the invention, a designated subnet manager 101 can ignore any HCA ports with un-known M_Key value and leave the corresponding link not initialized. The only impact of a hijacked HCA port M_Key can be that the HCA port may not be operational, and the designated subnet manager 101 can prevent host based software from communicating via this HCA port using normal communication, i.e. non-SMP/VL15 based communication.

Furthermore, the HCA ports may be set up with finite lease time on M_Keys 102, e.g. due to a high availability concern with the subnet manager(s) 101 that maintains the M_Key 102 lease period.

In accordance with an embodiment of the invention, the M_Key 102 can be created and managed by fabric administrators 110 and stored in secured memory on switches A-B 103-104 and/or HCAs 121-124. A microprocessor on a switch A-B 103-104 or a HCA 121-124 can access the memory for reading out the M_Key 102 or writing the M_Key 102 into the memory.

Transactional Command Line Interface (CLI)

In accordance with an embodiment of the invention, a transactional command line interface (CLI) can be operating in a network environment, e.g. from a network switch with the current master subnet manager (SM).

Figure 2:
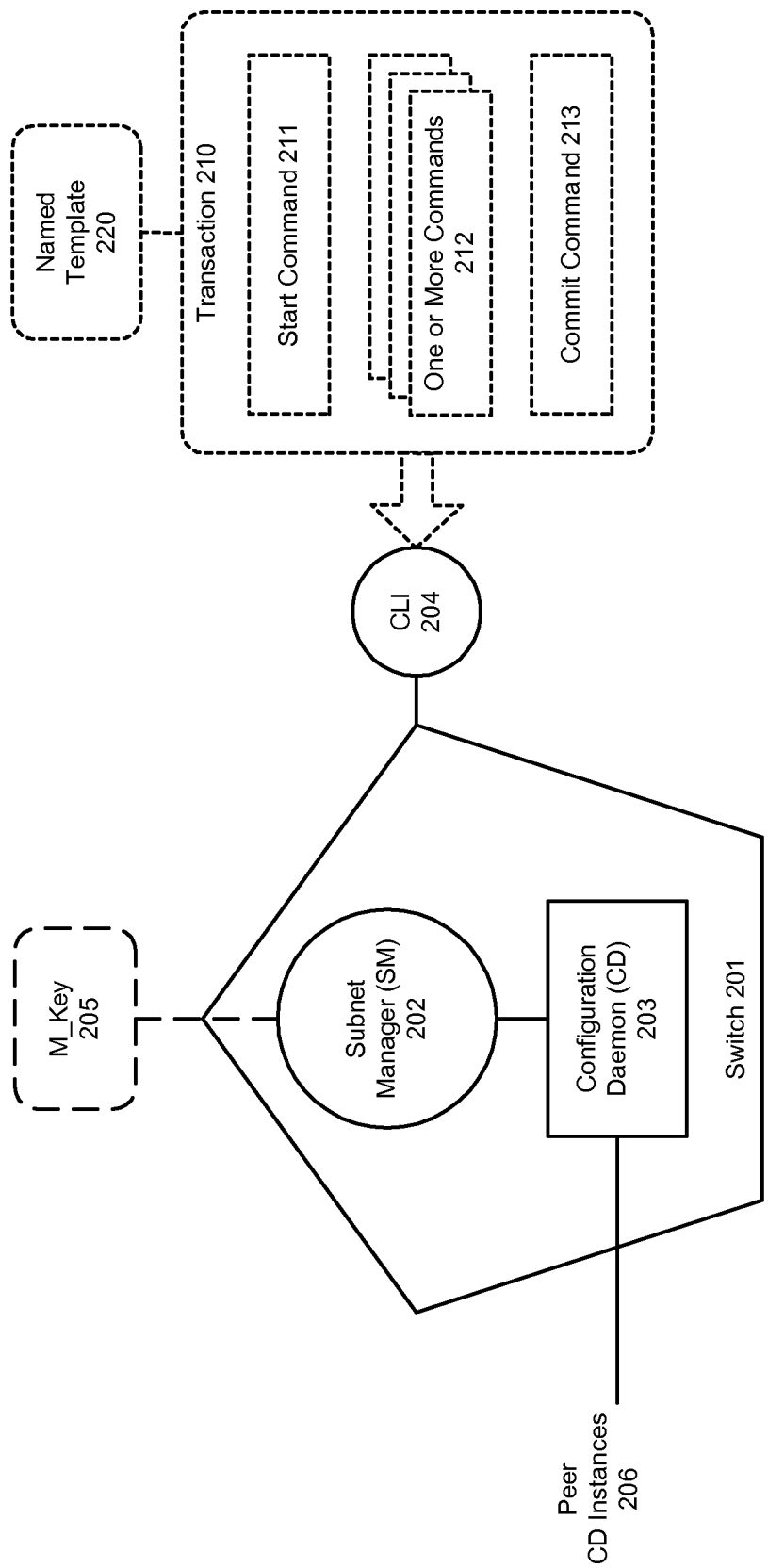
FIG. 2 shows an illustration for supporting a transactional command line interface (CLI) in a network environment, in accordance with an embodiment of the invention.

FIG. 2 shows an illustration of supporting a transactional command line interface (CLI) in a network environment, in accordance with an embodiment of the invention. As shown in FIG. 2, a switch 201 in a network environment, e.g. an IB subnet 200, can include a subnet manager (SM) 202 and a configuration daemon (CD) 203.

Furthermore, the switch 201 can provide a transactional CLI 204, which allows a user to configure and manage the IB subnet 200 using one or more transactions based on M_Key 205. As shown in FIG. 2, a transaction 210, which allows the system to perform various operations, can group one or more commands 212 between a start command 111 and a commit command 213.

In accordance with an embodiment of the invention, a single upgrade transaction, e.g. the transaction 210, may not perform conflicting operations. This can be implemented in a dynamic way where the initial operation(s) within the transaction 210 can define both the type of transaction 210 and which operations are allowed. For example, the start command 211 to initiate the transaction 210 can include parameter(s) that explicitly defines which operations are allowed.

Alternatively, a logical commit operation in a single upgrade transaction 210 can be implemented as several consecutive commit operations, each of which can represent a sub-transaction that groups together a set of similar operations. For example, all remove operations can be implemented as a sub-transaction before all add operations can be implemented as a subsequent sub-transaction. Such an automated scheme can have the advantage of making the normal update scenarios simpler for the user, and may also have the disadvantage of making the handling of a partially failed transaction more complex in terms of defining which operations have been completed and which have not.

Furthermore, the system allows the user to keep track of operations that can be grouped within a single transaction, in order to simplifying the handling of a partially failed transaction in terms of defining which operations may have been completed and which may have not.

In accordance with an embodiment of the invention, the transaction start command 211 can ensure that conditions for completing and committing the transaction are fulfilled. If the current conditions are not acceptable, the system allows the user to choose to abort the transaction. Furthermore, the user can re-issue a commit operation in force mode, after the failure of a normal commit due to current conditions.

Additionally, the command interface can generate a named template 220, which is a configuration that is not committed to the fabric, but instead stored in a local or remote file system. This named template 220 can also be generated from an already committed configuration.

The command interface allows a named template 220 to be loaded following a transaction start command 211. The named template 220 can also be a parameter for the start command 211. The user is allowed to modify the configuration information from the loaded named template 220 before committing it in the same way as any other configuration update.

Furthermore, the system can prepare different named templates 220 for different use cases. Also, based on the named templates 220, the system can perform backup operations to provide protection for the system, after a complete fabric outage, which may cause the loss of configuration information from all peer CD instances 206 in the fabric. Furthermore, the named template 120 allows an administrator to roll back to an earlier consistent configuration, when the administrator has committed an incorrect configuration. Thus, the administrator can avoid performing a potentially very complex sequence of explicit "undo" and "redo" operations.

In accordance with an embodiment of the invention, by not allowing the operation of changing current M_Key value 205 and the operation of deleting the (old) current M_Key value 205 in the same transaction, the system can avoid a race condition when a transaction fails into a state where one SM may have a current M_Key that is unknown to one or more of the other SM instances.

Appendix A provides further information with respect to providing a transactional command line interface (CLI) in a network environment and various aspects of the platform described throughout this disclosure. The information in Appendix A is provided for illustrational purposes and should not be construed to limit all of the embodiments of the invention.

Figure 3:
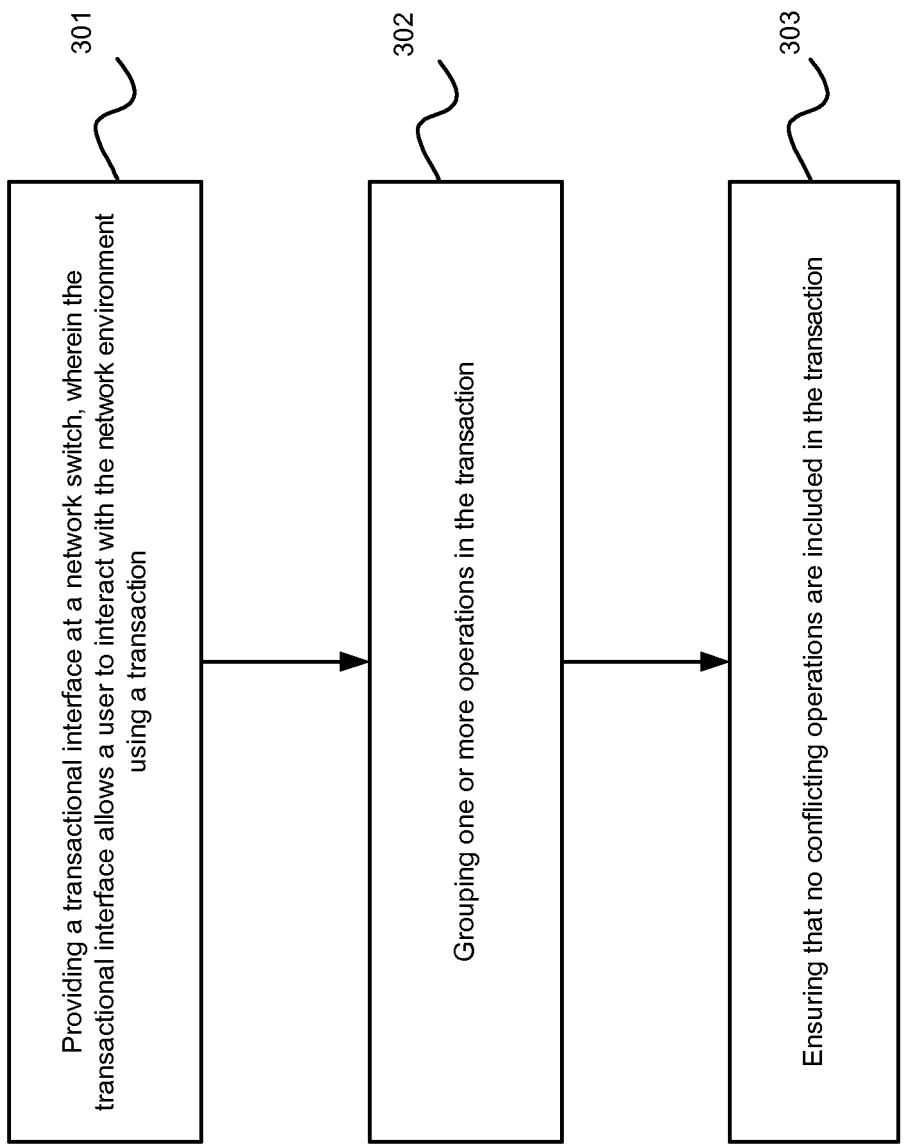
FIG. 3 illustrates an exemplary flow chart for supporting a transactional command line interface (CLI) in a network environment, in accordance with an embodiment of the invention.

FIG. 3 illustrates an exemplary flow chart for supporting a transactional command line interface (CLI) in a network environment, in accordance with an embodiment of the invention. As shown in FIG. 3, at step 301, the system can provide a transactional interface at a network switch, wherein the transactional interface allows a user to interact with the network environment using a transaction. Then, at step 302, the system can group one or more operations in the transaction. Furthermore, at step 303, the system can ensure that no conflicting operations can be included in the transaction.

Configuration Daemon (CD)

Figure 4:
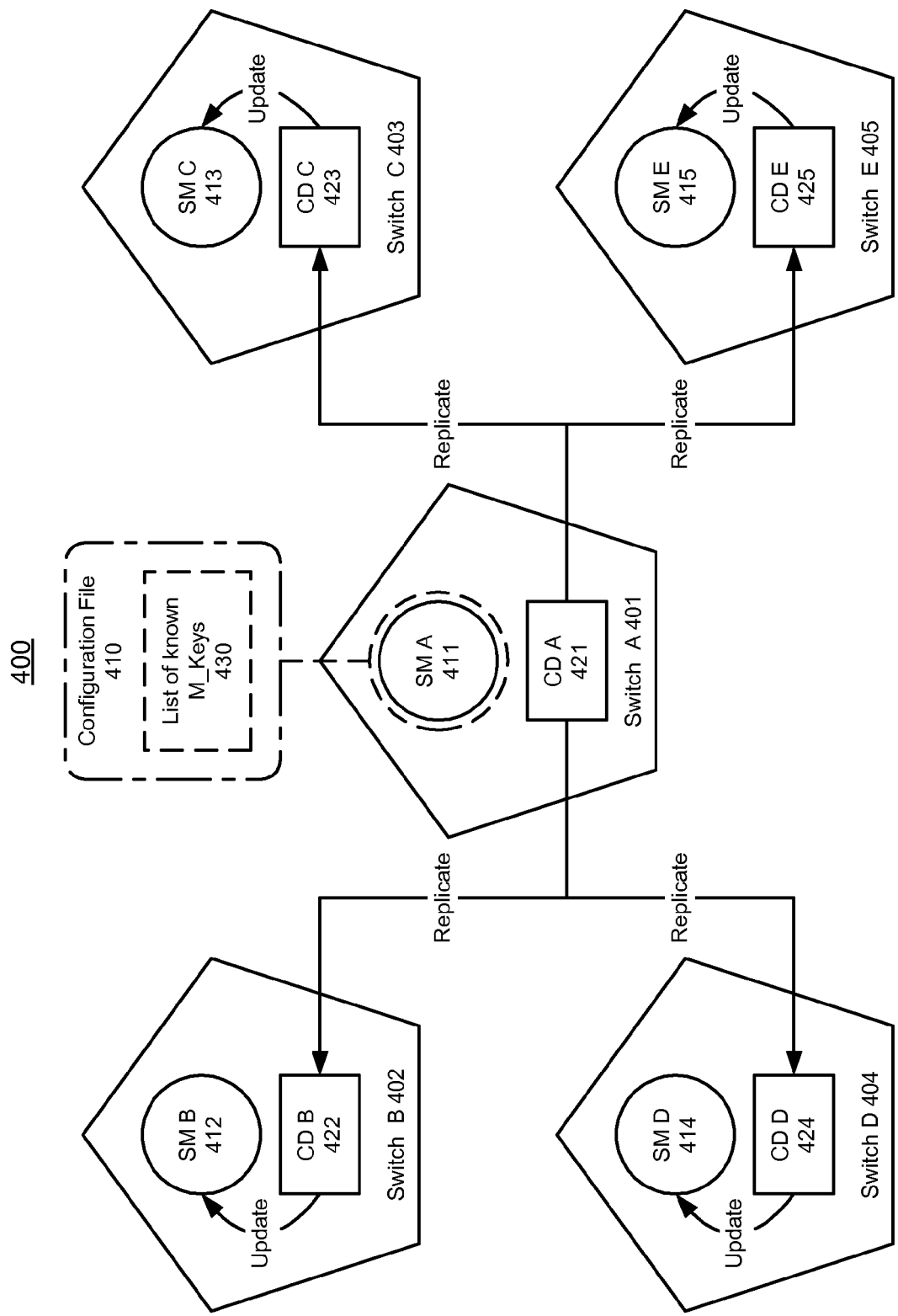
FIG. 4 shows an illustration for supporting subnet management using configuration daemons (CDs) in a network environment, in accordance with an embodiment of the invention.

FIG. 4 shows an illustration of supporting subnet management using configuration daemons (CDs) in a network environment, in accordance with an embodiment of the invention. As shown in FIG. 4, a network environment, e.g. an IB subnet 400, can include a plurality of network switches, e.g. switches A-E 401-405.

Each of the network switches A-E 401-405 can include a subnet manager (SM) and a configuration daemon (CD). For example, switch A 401 can include a CD A 421 in addition to a SM A 411. Here, SM A 411 is the master SM that is responsible for managing the subnet 400. Additionally, each of the switches B-E 402-405 includes a standby SM, e.g. one of SMs B-E 412-415, and a CD instance, e.g. one of CDs B-E 422-425.

Before the system allows an operation to be performed on the IB subnet 400, the master CD A 411 can perform a consistency check for various state information on the peer CD instances B-E 422-425. Such state information can include availability, compatible implementation/protocol version, correct current daemon run-time state, and correct current configuration state/version.

Then, the master CD A 411 can replicate a new management key (M_Key) configuration file 410 to the peer CDs B-E 422-425, before instructing the CDs B-E 422-425 to update the related SMs B-E 412-415 with a current M_Key value.

In accordance with an embodiment of the invention, the system can ensure that the master SM 411 always have a known M_Key list 430 that is longer than, or at least as long as, any other list maintained by a standby SM instance. Also, the order of replication can ensure that a new shorter list is applied to the standby SMs before it is applied to the master SM.

Thus, the master SM may never have a known M_Key list 430 that is shorter than any of the standby SM instances, and the system can use the length of the known M_Key list 430 as a criteria for determining mastership.

Furthermore, the order of replication can be based on the type of the transaction. When the transaction is an "addonly" transaction, the new configuration file can be used to update the known lists of the local (master) SM first, followed by the standby SM instances. If the transaction is not "addonly", then the local (master) SM is updated with the new known lists after the new known lists have been replicated to the standby SMs.

The replication process is considered successfully completed, after all peer CDs have confirmed receiving and storing the configuration file, and the configuration file have passed the checksum and metadata checks. Then, the master CD A 421 can complete the commit operation by instructing each peer CD B-E 422-425 to update the related SM B-E 412-415 with the new current M_Key value.

In accordance with an embodiment of the invention, the master CD A 421 can update the local SM A 411 after all peer CDs B-E 422-425 have been successfully updated. This sequence can be independent of the particular type of a transaction.

Additionally, the system may not instruct the SM instances to change the current M_Key value until all the SM instances, i.e. the actual SM instances—not just the corresponding CD instances—have received the updated known M_Key list. Thus, a new current M_Key value can always be known to all SMs, even when there is a transaction failure while updating the current value.

In accordance with an embodiment of the invention, an active CD, e.g. a partition daemon (PD) on an Oracle NM2 network switch, may not accept any commit or start command when the local SM node configuration is not augmented with hostname and internet protocol over InfiniBand (IPOIB) address list. Also, the CDs in the SM node list may need to have an appropriate firmware version that allows a start and/or commit operation.

Furthermore, the switches in the system (i.e. including the switches in the SM node list) need to have an appropriate firmware version before enabling the use of a secure M_Key setting. Configuring secure M_Key in a system with an incompatible firmware version, e.g. an older NM2 firmware, can cause some local operations, such as enabling/disabling local ports, to become dysfunctional. These dysfunctional local operations can include both the enable/disable operations based on explicit CLI commands, and automated enable/disable operations that are performed during system boot and cable hot-plug.

In accordance with an embodiment of the invention, the system can log and report the progress of various operations on the SM nodes. If the commit operation is not started or has not fully completed for all SM nodes, then the relevant information can be logged and displayed as a warning. Also, when the system uses a "force" option, the operation may be reported as either "fully successful" or "partially successful". On the other hand, when the system does not use the "force" option, the operation may not be reported as "partially successful". Furthermore, if an SM node is lost during a commit operation (i.e. it was present when the commit was commenced) then the operation may report a failure, and the user may then have the option to perform another commit operation, or perform a force commit operation, with the same working configuration.

Additionally, the system can perform force operations, even when some SM node defined CD instances are not available.

For example, when an SM node instance was missing at one point in time and then comes back as an incompatible SM node instance, e.g. an older version NM2 node. This system may require the problematic instance to be removed from the SM node list, or be upgraded back to a compatible SM node instance, before any subsequent secret M_Key configuration change can be made.

In order for a stateful fail-over to work, e.g. with a SM enabled older version NM2, there may not be any use of secret M_Keys in the fabric. The system can perform a disablesecretmkey CLI command before the downgrade, or perform a disablesecretmkey CLI command with "force" option after the downgrade, as a possible workaround for this case of temporarily downgrading SM node instance.

Additionally, the disablesecretmkey CLI command with "force" option can also be a way to recover a SM node when downgrade already has taken place.

Figure 5:
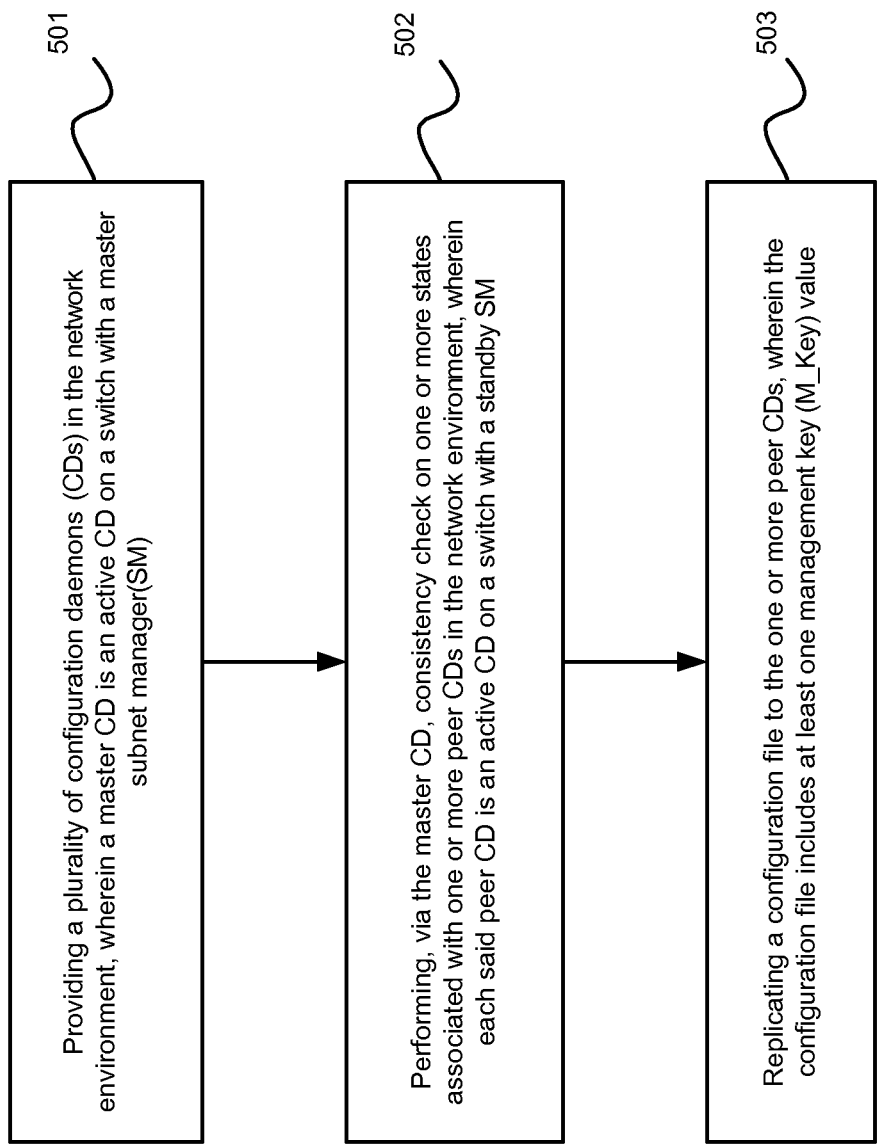
FIG. 5 illustrates an exemplary flow chart for supporting subnet management using configuration daemons (CDs) in a network environment, in accordance with an embodiment of the invention.

FIG. 5 illustrates an exemplary flow chart for supporting subnet management using configuration daemons (CDs) in a network environment, in accordance with an embodiment of the invention. As shown in FIG. 5, at step 501, the system can provide a plurality of configuration daemons (CDs) in the network environment, wherein a master CD is an active CD on a switch with a master subnet manager (SM). Then, at step 502, the master CD can perform consistency check on one or more states associated with one or more peer CDs in the network environment, wherein each said peer CD is an active CD on a switch with a standby SM. Furthermore, at step 503, the master CD can replicate a configuration file to the one or more peer CDs, wherein the configuration file includes at least one management key (M_Key) value.

The Management Key (M_Key) Configuration File

In accordance with an embodiment of the invention, a management key (M_Key) configuration file 610 can be transmitted between the configuration daemons (CDs). The management key (M_Key) configuration file can include a trusted management key (M_Key) value that is presented to a user, and one or more key values that are transparently generated based on the trusted M_Key. Additionally, the M_Key configuration file can include one or more of a fixed function, function parameter, and a locally generated random number.

Figure 6:
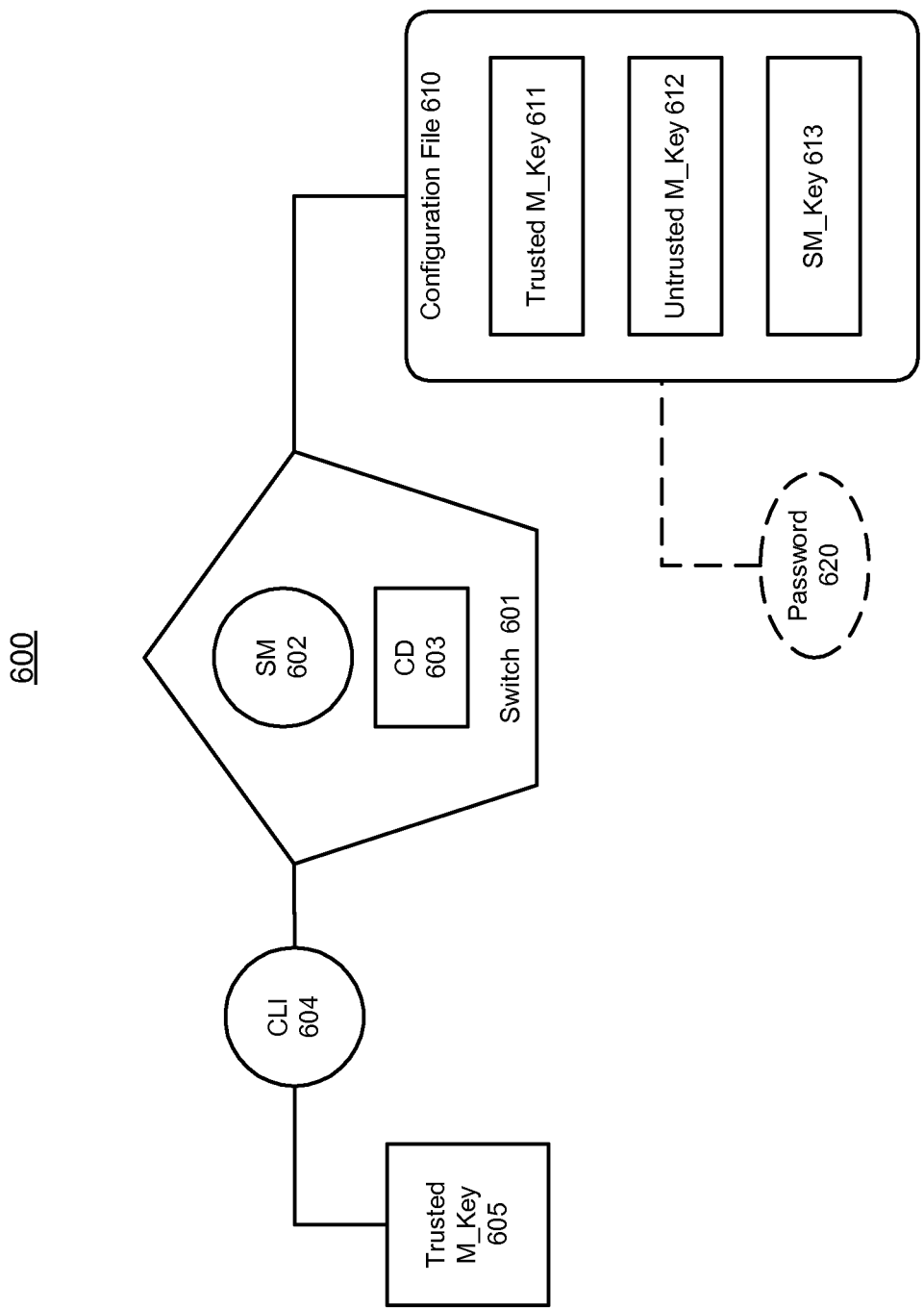
FIG. 6 shows an illustration for supporting a management key (M_Key) configuration file in a network environment, in accordance with an embodiment of the invention.

FIG. 6 shows an illustration of supporting a management key (M_Key) configuration file in a network environment, in accordance with an embodiment of the invention. As shown in FIG. 6, a switch 601 in the network environment 600 can include a subnet manager (SM) 602 and a configuration daemon (CD) 603. Furthermore, the switch 601 can provide a command line interface (CLI) 604, e.g. a "smsubnetprotection" CLI interface, to the user.

While the CLI interface 604 may only present a single set of management key (M_Key) values, e.g. a trusted M_Key 605 value, to the user, the underlying implementation in the switch 601 can use additional sets of keys, which can be included in an M_Key configuration file, e.g. the "PD_M_Key-config.conf" file for NM2 network Switch.

For example, the M_Key configuration file 610 can include: the trusted M_Keys 611 used for nodes defined as "trusted", the untrusted M_Keys 612 used for nodes that are considered not trusted, and the subnet manager keys (SM_Keys) 613 used for basic SM-SM authentication and negotiation.

The handling of different M_Keys for trusted and un-trusted nodes can ensure that trusted M_Keys 611 used for trusted nodes (switches in particular) can not be observed/learned by un-trusted nodes. This mechanism can also apply to the cases where the trusted nodes are explicitly authenticated via encryption based protocols whereas the un-trusted nodes are not authenticated at all.

The M_Key configuration file 610 can contain a list of symbolic and hex M_Key values. Also, the M_Key configuration file 610 can contain an explicit identification of the current M_Key value. In addition to the M_Key information, the M_Key configuration file 610 can also include metadata information including format revision, time stamp and ID (e.g. NM2 hostname+IP) for last update, update revision number and checksum.

Furthermore, the M_Key configuration file 610 can record each added value as a list of associated values. Also, the CD instance 603 can keep track of the current status for the sets of M_Key values, such as information on all the M_Key values with a specific type. For example, the M_Key configuration file 610 can include multiple lines with three values in each line, where each position in the line defines a key type and a complete line can be defined as "current" or "new-current".

In accordance with an embodiment of the invention, the management key (M_Key) configuration file 610 can be encrypted using a password 620 (e.g. with a default value). The system can use the encrypted transfer, which is based on a common private password on each node, in order to ensure that the sensitive data is not available to anyone being able to observe data traffic on a management network connecting different CD instances.

Furthermore, when an "add" command is executed, the trusted M_Key value 605 is what a user of the CLI 604 relates to. Then, the system can generate the other key values transparently for the CLI user. The additional values can be generated as the sum of the user specified key value and a 64 bit value generated based on a unique permutation of the current password. For example, the at least eight characters in the current password can be permutated in a defined way for each key type—e.g. rotate one, rotate two.

In accordance with an embodiment of the invention, the system can ensure that any formulas or parameters used to generate additional key values are not part of the information to be replicated and synchronized among the SM nodes. For example, the M_Key values can be generated as part of preparing the update transaction information, without relying on any state for generating keys to be present among the CD or the SM instances when the configuration has been defined.

Furthermore, new M_Key values can be generated as a function of both a currently defined encryption password and a random value in order to minimize the risk of someone deducting an original password or an original M_Key if either password or original M_Key should become available to someone already knowing the derived M_key value.

For example, in addition to the sum of the two 64 bit values, a platform generated random number can be included in the sum, in order to prevent giving away the password value. Thus, a party who knows both an un-trusted M_Key and a trusted M_Key encrypted with the password will not be able to generate the corresponding password or trusted M_Key via a very limited number of arithmetic operations.

Additionally, the use of incorrect password, e.g. as a result of not updating the password correctly on all SM nodes, can cause a checksum error on the remote side. In order to differentiate the type of checksum error due to incorrect password from the type of checksum error due to file corruption during transfer, there can be a checksum for both the encrypted file and a checksum for the original file version. Here, a checksum error for the encrypted file can indicate a transfer error, whereas a checksum error for the un-encrypted file can indicate an incorrect password. Also, there can be metadata for both the encrypted and un-encrypted files in order to ensure consistency and multiple version compatibility at both levels.

In accordance with an embodiment of the invention, prior to initiating a transaction, the system can ensure consistent password encryption for each CD.

A challenge for verifying the password encryption is that the password itself may not be communicated explicitly across the potentially insecure management network. Instead, the system can use the password to encrypt a well known message string (i.e. well known "a priori" by all SM nodes). Then, the verification of consistency of the current password can be achieved by sending the encrypted version of the well known message and having the peer SM nodes to confirm that the decryption of the message results in the original well known message.

For example, the well known message can be the current password string itself. Furthermore, a dedicated well known string can be a more robust scheme, since the password string typically has a limited length. Additionally, by maintaining a list of historical password or key values, it is possible for the verification logic to check with older password/key values if the current one fails and thereby identify a case of incomplete updates among the SM nodes. Also, a remote check failure for the current value could lead to encryption and checking of older values to determine whether the remote SM node has yet been updated with the current password value.

In accordance with an embodiment of the invention, such a verification method can also be used to verify that current public/private key infrastructure is consistent among the involved SM nodes, i.e. to ensure that no accidental update has taken place following authentication/verification during discovery/re-discovery. If public/private key infrastructure is in place, then this can be used for encryption of replicated configuration information in order to avoid maintaining a separate encryption password on each SM node.

Start Logic and Consistency Check

In accordance with an embodiment of the invention, when a transaction start command is executed from a current master node, the state information on various subnet manager (SM) nodes can be verified so that any inconsistencies in the state information can be detected. Also, a pre-condition for an update transaction can be that the system has a consistent (i.e. commit completed and correct checksums) configuration file with the same configuration update revision number.

The administrator can ensure that correct configuration can be carried forward in an IB subnet, following a failed update transaction that may cause the state information on the SM nodes to be inconsistent. The administrator can initiate a new update transaction to bring the various SM nodes in synchronization. Additionally, an administrator can verify that the inconsistent state does not represent any unexpected condition, and can perform the diff operations that can explicitly provide the detailed difference in various SM nodes or between a specified pair of SM nodes.

Furthermore, when the local configuration on the current master SM node is not the most recent one or is incorrect, the system can perform a special operation from the master SM node to fetch the current configuration from another standby SM node, and use this configuration as a starting point for the working configuration when performing a new update transaction. Additionally, a special "force" option can be used to override consistency checks for both start and commit operations, e.g. after the inconsistent state has been analyzed and the correct configuration for synchronizing the various SM nodes have been determined by the administrator.

In accordance with an embodiment of the invention, when fatal synchronization problems occurs in the IB subnet, the administrator can be allowed to resolve the underlying problem before continuing or restarting any update transaction. For example, when performing a commit operation, the configuration state of the various SM nodes is expected to be exactly the same as the configuration state when the corresponding start operation was performed, i.e. any change in this period may imply that some unsolicited state change has taken place and may indicate a fatal synchronization error between the various SM nodes. Additionally, at both start and commit time, it can be verified that only a single master is present among the SM nodes. If otherwise, then there is a fatal synchronization problem among the SM nodes.

Furthermore, the consistency of encryption password value among the various SM nodes can be verified as part of the transaction start operation, and can again be verified in the initial part of the commit operation along with the verification that no configuration change has taken place. Additionally, the state consistency checks can be available as command line interface (CLI) subcommands from any SM node at any point in time.

State Synchronization Between the CD and the SM

Figure 7:
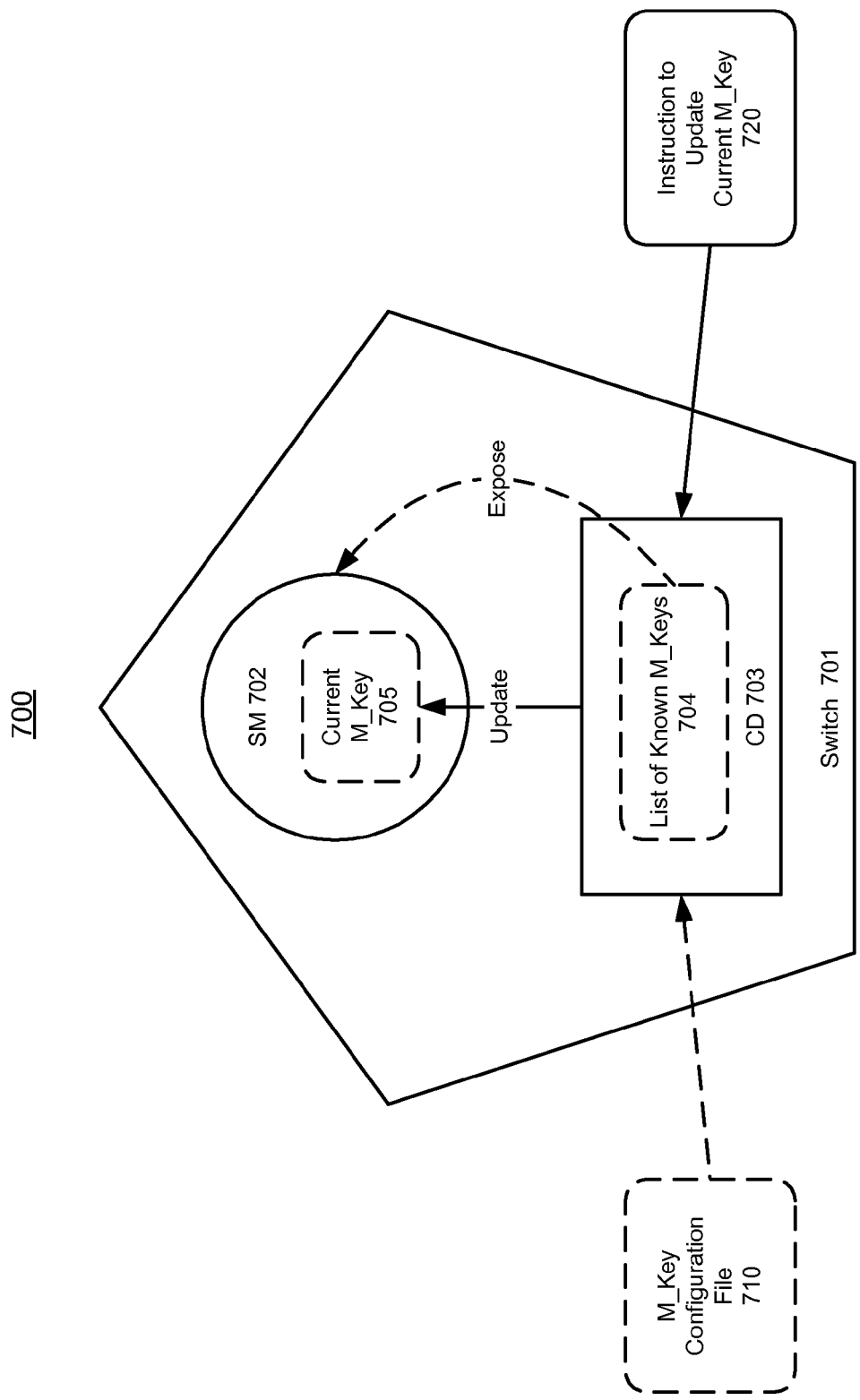
FIG. 7 shows an illustration for supporting state synchronization between a configuration daemon (CD) and a subnet manager (SM) on a switch in a network environment, in accordance with an embodiment of the invention.

FIG. 7 shows an illustration for supporting state synchronization between a configuration daemon (CD) and a subnet manager (SM) on a switch in a network environment, in accordance with an embodiment of the invention. As shown in FIG. 7, a switch 701 in an IB subnet 700 can include a subnet manager (SM) 702 and a configuration daemon (CD) 703.

When the CD 703 receives a new M_Key configuration file 710 as part of a commit transaction, the CD 703 can store the new M_Key configuration file 710 and make the list of known M_Key values 704 available to the local SM 702. Then, the SM 702 can start using the new list of known M_Key values 704 in subnet probing/discovery operations. The SM 702 may continue using the previously defined current M_Key value 705 when updating/setting M_Key value for any subnet management agent (SMA) instance.

The CD 703 may not update the current M_Key value 705 used by the SM 702, prior to receiving an instruction from the master CD. Also, the CD 703, when it is a standby CD, can communicate the new list of known values 704 to the local SM 702, before the operation is acknowledged to the master CD, which implements the distributed transaction.

Unlike partition configuration updates, the new list of known M_Keys 704 can be made available to the SM 702 immediately, since this does not impose any state change in the subnet, and the manual and automatic procedures can make sure that a new list of known M_Key values 704 may always include any secret M_Key value that may be present in a switch node in the system (i.e. including a switch node with a disabled SM).

Furthermore, in order for the list of known M_Key values 704 to be used as part of the consistency check and master election among secret key enabled SMs in the subnet, the order of updates can ensure that the current master always has the largest list of known M_Key values, and thereby avoid any un-intended master handover in the middle of an update transaction.

In accordance with an embodiment of the invention, the CD instance 703 can update the local state information about the current M_Key value 705, when the CD instance 703 is instructed by the master CD, which controls the commit operation. Also, the CD instance 703 can instruct the local SM 702 to start using the new current M_Key value, e.g. via a dedicated SM CLI command.

Furthermore, whenever the SM 702 or CD 703 is restarted, the CD instance 703 can update the SM 702 with the current local secret key configuration. Thus, the system can ensure that the subnet management operation is always consistent with the current configuration, and the system can ensure that no master election is performed without the current secret key configuration in place. Also, the state synchronization between CD 703 and SM 702 during startup can make sure that the SM 702 has the current configuration prior to initiating the initial subnet discovery.

In accordance with an embodiment of the invention, the CD 703 can use a dedicated SM CLI command to communicate the new list of known M_Key values 704 to the SM 702. For example, the SM 702 may only receive the secret key configuration via the private CLI commands, and may not perform any persistent storing of this configuration (i.e. the secret key configuration may only be part of the SM run-time image).

The SM CLI command can include a plain list of comma separated hex M_Key values that defines the list of known M_Key values 704. Furthermore, the SM CLI allows three separate lists to be specified, in order to take three independent M_Key values as input, such as the trusted M_Key, the untrusted M_Key and the SM_Key.

For example, in a NM2 switch, the new current M_Key value can be the same as what was identified as "new current" in the replicated M_Key configuration file. The old current M_Key value can remain to be part of the known M_Key list. (I.e. two update transactions may be needed in order to delete a value that has been used as current.)

In order to ensure that a new current M_Key value is not activated prematurely, the replicated configuration file may always contain information about the (still) currently used M_Key value as well as the intended new value. When a set-current operation takes place (i.e. the corresponding command is received from the master CD implementing the transaction), the new M_Key value can be signaled to the SM 702, and then the recorded currently used M_Key value can be updated to reflect the new specified value before the operation is acknowledged. Thus, the master SM can have a known M_Key list longer than, or at least as long as, any other list maintained by a standby SM.

Furthermore, the CD instance 703 can keep track of both the actual current M_Key value 705 and the enabled state. For example, the handling of the disabling and enabling of secret M_Key for the SM 702 can be reflected via a value of zero for the disabled state, and a non-zero current value for the enabled state. Furthermore, the CD instance 703 can provide the value of zero, instead of the current value, to the SM 702, when the system is set to be in a disabled state. Then, the CD instance 703 can signal the (real) current M_Key value to the SM 702, when the system is changed from a disabled state into an enabled state.

In accordance with an embodiment of the invention, the SM 702 can receive explicit enable/disable notifications for the use of secret M_Keys. Also, the SM can use a readable M_Key as defined in a configuration file, e.g. the opensm.conf file, when the use of secret M_Key is disabled (as a default). Additionally, the readable M_Key value in the configuration file can be maintained by the CLI commands. Furthermore, the M_Key protection bits to be used by the SM 702, which reflects readable M_Key, can be defined in the opensm.conf configuration file. On the other hand, the M_Key protection bits can be implicitly defined when the "secret" mode is enabled via the SM CLI interface.

Also, the M_Key lease time value can be a constant defined in the configuration file. For example, a constant defined by the NM2 FW revision specific opensm.conf template can be sufficient. Alternatively, the M_Key lease time value can be configurable. This M_Key lease time value can be large (e.g. in the order of at least one minute) so that there is never any practical risk that the SM can not refresh the lease time before the deadline (i.e. as long as at least one SM is sweeping). Additionally, the platform level monitoring daemons can also have a role in refreshing the local lease time.

Figure 8:
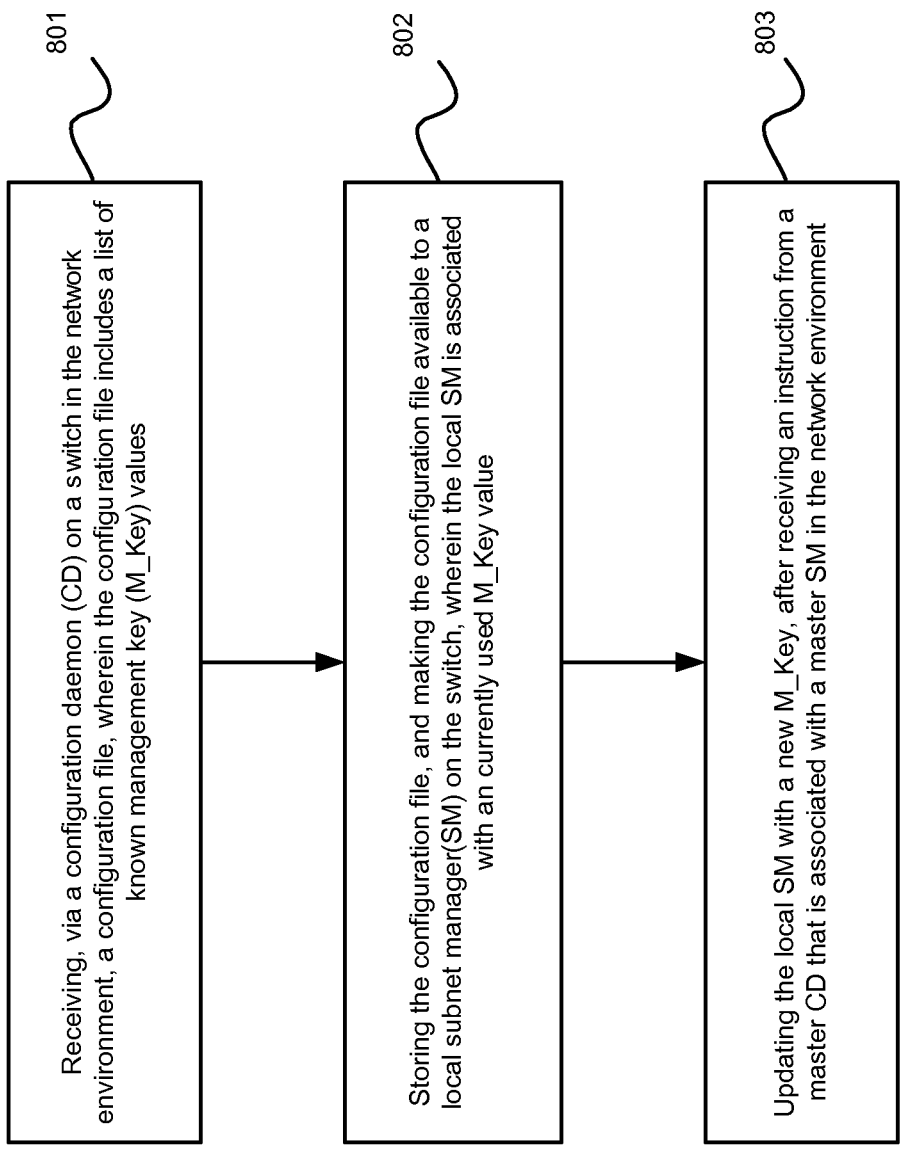
FIG. 8 illustrates an exemplary flow chart for supporting state synchronization between a configuration daemon (CD) and a subnet manager (SM) in a network environment, in accordance with an embodiment of the invention.

FIG. 8 illustrates an exemplary flow chart for supporting state synchronization between a configuration daemon (CD) and a subnet manager (SM) in a network environment, in accordance with an embodiment of the invention. As shown in FIG. 8, at step 801, a configuration daemon (CD) on a switch in the network environment can receive a configuration file that includes a list of known management key (M_Key) values. Furthermore, at step 802, the CD can store the configuration file, and make the configuration file available to a local subnet manager (SM) on the switch, wherein the local SM is associated with an currently used M_Key value. Then, at step 803, the CD can update the local SM with a new M_Key, after receiving an instruction from a master CD that is associated with a master SM in the network environment Failed Update Transaction and Master Subnet Manager (SM) Failover When a update transaction is successfully completed, the configuration daemons (CDs) on all subnet manager (SM) nodes can have the same configuration, e.g. with the same configuration update revision number. Additionally, the CDs can either have the same current M_Key value or have no new current M_Key value.

On the other hand, a failed update transaction may cause an availability or configuration issue with the current SM nodes in an IB subnet. For example, when an update transaction fails during the replication phase, the CDs may have different current update revision number values (and with different file checksums). Also, if the replication phase is completed successfully, but the update of current M_Key value is not completed, then the CDs may have the same update revision number values and same basic file checksums, but with the different current M_Key value.

In these scenarios, the administrator can use a CLI command provided by the SM Node switches, e.g. the listactive command provided by the NM2 switches, in order to discover and resolve the current status. Then, the administrator can decide how to perform another update transaction on the current master CD, in order to bring the system to a well defined state, e.g. using force options and updating the list of SM nodes in the system.

If a failed transaction leaves the current persistent configuration with both an old current M_Key value and a new current M_Key value, then any new transaction can start out in this state, and behave as if a set-current CLI command had been executed for the M_Key value that is reflected as "new" in the current configuration file. Furthermore, the user can be aware of this current status, and is allowed to modify the setting if needed. Additionally, a failure to observe the rules for what operations can be performed following a failed transaction can lead to an incorrect master election in the subnet, e.g. causing either multiple or no master SMs in the subnet.

In accordance with an embodiment of the invention, the transaction start command can present all relevant state information for the configuration on all SM nodes to the user. Also, the transaction start command can make sure that the user is aware of any inconsistencies, e.g. after a failure of an updated transaction. Furthermore, the transaction start command can perform special force actions in order to initiate a transaction, and allows the user to select the starting point configuration from any of the available SM nodes.

If the active master is operational after a failure of an updated transaction, the first step to handle the failed update transaction is to check availability and configuration of other SM nodes, potentially based on error logs/messages from the failed update transaction. If the problem can be corrected, then the same transaction can be retried (i.e. without use of force mode). If the problem can not be corrected (e.g. an SM node—potentially the old master—is no longer operational/available), then any delete operation may not be re-tried in force mode, since this operation may delete a key value that may still be in use by an enabled SM. In accordance with an embodiment of the invention, a disable operation can be retried in force mode, since the disable operation does not change the current known key list and does not impose any danger of incorrect master election procedures. Furthermore, depending upon the SM priorities and globally unique identifiers (GUI Ds) of the currently available SM nodes relative to the failed SM node(s), the disabled or enabled state of the system may change as the failed SM nodes become operational again.

Furthermore, force retrying a failed enable operation is safe, since it does not impose any danger of incorrect master election procedures. Also, the state of the system in terms of enabled/disabled state of the master may not be certain when the same key configuration is present.

Additionally, force retrying an add operation is safe, since it may increase the number of known keys and thereby it can ensure that the SM nodes have received this update and may take precedence in terms of master election relative to the currently unavailable SM node(s).

In accordance with an embodiment of the invention, by setting a newly added key as current, the system can be configured for fencing off a SM on the unavailable SM node(s). Thus, the SM on the unavailable SM node(s) may not influence the state of any node (potentially including itself) that has received the updated secret M_Key value.

The system can use force-add and set-current operations to ensure the fencing off an SM node with un-defined state, without any need for physical service actions. Such fencing mechanism allows the SM nodes configuration to be changed, and also allows the current partition policy to be updated.

When a leaf switch is in an undefined state that can cause the partitioning state of the directly connected hosts to be not controllable, the partitioning configuration may not be updated or changed in a way that conflicts with the current configuration that is assumed to be implemented by an active SM on that leaf switch.

In order to update or change the partitioning configuration, the leaf switch can be brought to a well defined state with no active SM, or the SM can be brought in synchronization with the rest of the SM nodes, via some additional service actions.

In accordance with an embodiment of the invention, the system can support master SM failover in the middle of an M_Key update transaction, which follows the same ACID transaction principles as partition policy updates.

The system can distribute the new list of known M_Key values first, and define a new M_Key value as current for all the SMs in the final part of the commit operation. Also, the enhanced master election protocol can ensure that the elected master can always be the SM that has the longest list of known key values and can be best suited to handle the current configuration.

Thus, the system can ensure that there may never be a case where a new master SM is not be able to discover/configure the subnet because of lack of knowledge about the most recent M_Key value. For example, all SM enabled switch nodes can have the same new policy if the policy is enabled on any one of switch nodes, otherwise if the policy has not been replicated to all SMs, then no SM can have the new policy enabled.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

APPENDIX A

A Sample CLI Interface

For example, the Oracle NW2 network switch can provide a smsubnetprotection CLI interface to support the transactional protocol as described in the above sections. The smsubnetprotection CLI interface can provide the following commands:

Start

The start command can check (via CD) whether all required CD instances ("smnodes") are available and operational. If so, the system can establish a working copy of the current M_Key configuration. The start command can include options to force start, to implicitly enable, and to specify a type (e.g. "addonly" or "deleteonly") for the transaction.

If force option is chosen, the operation can succeed if not all CDs are available, but a warning to the user as well as a log entry identifying the set of "missing" CDs can be made if not all CDs are available.

In order for the start command to succeed, the enabled status for the use of secret M_Key may need to be set. The enabled status can initially be set via using the enablesecret-mkey command, or via choosing the "enable" option that can be specified for the start command. The reason for having the "enable" option for the start command is to ensure that secret M_Key usage can be enabled together with a defined current value and/or list of known values.)

Furthermore, if "addonly" type is specified for a transaction, then no delete operations is allowed in this transaction (vice versa if "deleteonly" is specified). It is also not legal to specify both "deleteonly" and "addonly" for the same transaction. If neither "deleteonly" nor "addonly" is specified, then only a set-current operation is allowed. On the other hand, the set-current operation can be used independently of whether the transaction is "addonly" or "deleteonly".

Listactive

The listactive command can display the last committed list of M_Keys as well as the current M_Key value and the enabled status. This command can be invoked independently of any on-going transaction. The listactive command can include options for listing symbolic and/or hex.

Listworking

The listworking command can display the resulting list and current base of changes since the last start command (i.e. that has not been committed). The listworking command can include options for listing symbolic and/or hex.

Listlocalmkey

The listlocalmkey command can display the current M_Key value (if any) defined for local switch chip (e.g. an IS4 instance). The output can reflect if any M_Key is defined, and if so if it is "readable" or "secret". Additionally, the output can reflect the case where no M_Key is used.

In the case of configuration errors (e.g. provoked by manual access to the sysfs interface), the output can also reflect illegal, or un-supported, protection bit values. Also, the output can reflect that the NM2 SM is not able to manage this node, e.g. when the M_Key value is zero, but the protection bit value indicates a "secret" mode.

This operation can be performed from any NM2 independently of local SM enabled or master status.

Setlocalsecretmkey

The setlocalsecretmkey command can set the M_Key value for the local IS4 instance to the specified value and set the associated mode to "secret" (i.e. the M_Key protect bits). The setlocalsecretmkey command can include options for specifying symbolic with password requirements or plain hex.

This operation can be performed from any NM2 node, independently of local SM enabled or master status. The value zero is not a legal secret M_Key value, and the CLI command can reject it.

Add

The add command can add a new M_Key value to the working list. The add command can include options for specifying symbolic with password requirements or plain hex. The add command is only legal if the transaction has been started with "addonly" option.

The revoking of any incorrectly added value(s) can be accomplished by explicitly aborting the current transaction via the abort subcommand. This ensures that the adding and then the setting current of a newly added value is cleaned up in a consistent and well defined way.

Delete

The delete command can remove an existing M_Key value from the list. The delete command can include options for specifying symbolic or plain hex.

This command is only legal if the transaction is started with "deleteonly" option. Furthermore, it is not legal to remove the "current" value, nor the "old current" value, which is enforced by the interface. Also, it is not legal to delete any value that may still exist as "current" for any NM2 node in the system that may be temporarily offline at the moment. This constraint may not be enforced by the interface, but can be documented as a rule that the administrator should follow.

Additionally, the revoking of any incorrectly deleted value(s) can be accomplished by explicitly aborting the current transaction via the abort subcommand.

Set-Current

The set-current command can set an already defined M_Key value as the current M_Key value that is used by the master SM following a subsequent commit operation. The set-current command can include options for specifying symbolic or plain hex.

When updating current M_Key value, then the old current M_Key value can be recorded. It is not legal to both update the current M_Key value and delete the old current M_Key value in the same update transaction. Also, multiple set-current operations during the same transaction can be legal as long as they all identify a currently defined M_Key value, and only the last operation prior to commit may have any impact on the resulting active configuration.

If no current M_Key value is defined when a configuration is committed, then this is accepted, but the result is the same as if the configuration had been disabled.

Once a current M_Key value is defined via the set-current command, then it is not possible to unset it unless the configuration is disabled. This also implies that it is not possible to add more known values while a configuration is disabled.

Thus, in order to update the known list when in disabled mode, the configuration has to be temporarily enabled while the configuration is updated, but can then be immediately disabled again afterwards.

Commit

The commit command can make the configuration that has been (re)defined since the last start operation active in the system via the PD-PD commit protocol. The commit command can include option for force commit.

By default, the operation can fail if not all defined ("smnodes") PD instances are present. If "force" option is specified, then the operation may still succeed if not all PD instances are available but a warning and log message can be generated.

Abort

The abort command can discard all operations that have not been committed since the last start command without any impact on the active configuration. Any incorrect argument to delete or add commands can be revoked by performing an abort operation.

Setpassword

The setpassword command can define a password to be used for encrypting M_Key list before replicating to other nodes. Furthermore, same password can be defined on all "smnodes" NM2s and can be updated in the same controlled way as when updating "smnodes" membership.

The password with an alphanumeric string of at least 8 characters is considered strong. The system may provide a built in-default password value, which can be replaced via the setpassword command.

The method for encryption can be based on a open source toolkit, where the user supplied password can be used as input to the encryption/decryption algorithms.

The specified password can also be used to generate derived key values based on key values specified by the add command. The specified password can be persistently recorded locally on the NM2, until it is explicitly updated again.

Whenever a password has been updated on one "smnode", it has to be updated on the other "smnodes" before any transaction can take place.

Enablesecretmkey

The enablesecretmkey command can represent an implicit start and commit transaction for the currently defined configuration. The enablesecretmkey command can include option for "force start/commit".

If no configuration is currently defined, then the command may have no effect, except for verifying that all "smnodes" peers are available and in the correct state, and also setting the enabled status to "enabled". (The enabled status is a dedicated flag in the underlying configuration file.) If no configuration is currently defined, then the enabled status may have no effect on the operation of the SM.

Disablesecretmkey

The disablesecretmkey command can represent an implicit start/commit transaction for the currently defined configuration with the side effect that no secret M_Key value can be used by any SM on "smnodes". Unlike an ordinary transaction, the start/commit transaction does not update the current M_Key value defined by the configuration, but sets the "enabled status" to "disabled". The disablesecretmkey command can include option for "force start/commit".

The disabled status implies that the SM may either be using any already defined readable M_Key value, or not use any M_Key value at all. Also, the list of known secret M_Key values can still be defined, and the master SM can still be able to discover and manage any port/node that was not available during the initial update to "non-secret" M_Key, but that is now available and with one of the known secret M_Key values active.

The update transactions, e.g. the transactions caused by commit, enablesecretmkey or disablesecretmkey subcommands, can be implemented in a way that is safe in terms of that the master election state within an operational subnet with NM2 2.1 firmware on all SM enabled NM2s can be well defined also if the transaction fails.

Furthermore, a failed transaction may be repeated in order to try to complete it successfully in the case of a transient problem without any inherent risk of more dramatic inconsistencies. Also, fencing operations, such as defining an additional known key value as well as making it current, can be done in force mode to ensure that an NM2 node with unknown state may not be able to modify the state of the subnet.

Additionally, the disabling use of secret keys following a failed update transaction, or the deletion of known key values following a failed transaction may lead to inconsistent master election in the subnet and may therefore not be attempted before the set of smnodes have not been brought to a consistent state.

Here, bringing the system to a consistent state can involve performing a enablesecretkey or an update transaction from the current master, based on whether the (possibly new) master has the updated (desired) current configuration.

What is claimed is:

1. A method for supporting network management in a network environment, comprising:
   providing, at a plurality of switches in a network environment that includes a subnet, a plurality of subnet managers and configuration daemons, including, for each switch, a subnet manager and a configuration daemon that are associated with that switch,
      wherein a master configuration daemon is an active configuration daemon on a switch with an associated master subnet manager also on that switch,
      wherein the master configuration daemon communicates with peer configuration daemons within the subnet, and
      wherein each switch provides a transactional interface that allows management of the subnet using one or more transactions;
   prior to allowing an operation to be performed on the subnet as part of a transaction, performing, via the master configuration daemon, a consistency check on state information associated with one or more peer configuration daemons in the network environment;
   replicating, via the master configuration daemon, a configuration file to the one or more peer configuration daemons, wherein the configuration file includes at least one management key (M_Key) value;
   receiving, by the master configuration daemon, confirmation from the one or more peer configuration daemons that the replicating has successfully completed when the peer configuration daemons have received and stored the configuration file;
   performing a consistency check on the configuration file received and stored at the one or more peer configuration daemons to determine that the configuration file received and stored at the one or more peer configuration daemons is consistent with the configuration file replicated via the master configuration daemon;
   instructing, via the master configuration daemon, and after the master configuration daemon has received confirmation that the replicating has successfully completed and the consistency check has been performed, each of the one or more peer configuration daemons to make the stored configuration file available to its associated subnet manager (SM) on the switch; and
   performing a commit operation by the master configuration daemon instructing each of the one or more peer configuration daemons to update its associated subnet manager with a list of M_Key values provided by the configuration file.

2. The method according to claim 1, further comprising:
   determining an order for replicating the configuration file to the one or more peer configuration daemons based on a type of a transaction.

3. The method according to claim 2, further comprising:
using the configuration file to first update one or more known lists of M_Key values on the master subnet manager, when the transaction is an add-only transaction.

4. The method according to claim 2, further comprising:
using the configuration file to first update one or more known lists of M_Key values on one or more subnet managers other than the master subnet manager, when the transaction is not an add-only transaction.

5. The method according to claim 1, further comprising:
allowing the one or more states to include
availability of the one or more peer configuration daemons,
compatible implementation/protocol version,
correct current daemon run-time state, and
correct current configuration state/version on the one or more peer configuration daemons.

6. The method according to claim 1, further comprising:
verifying a consistent encryption password for each configuration daemon prior to initiating a transaction.

7. The method according to claim 1, further comprising:
prohibiting changing a new current M_Key value and deleting an old current M_Key value in a same transaction.

8. The method according to claim 1, further comprising:
ensuring that the master subnet manager has a known M_Key list not shorter than any M_Key list maintained by the other subnet manager instance.

9. A system for supporting network management in a network environment, comprising:
a plurality of switches, having one or more microprocessors, in a network environment that includes a subnet, a plurality of subnet managers and configuration daemons, including, for each switch, a subnet manager and a configuration daemon that are associated with that switch;
a master configuration daemon, wherein the master configuration daemon is an active configuration daemon on a switch with an associated master subnet manager also on that switch,
wherein the master configuration daemon communicates with peer configuration daemons within the subnet, and
wherein each switch provides a transactional interface that allows management of the subnet using one or more transactions;
wherein the master configuration daemon operates to
prior to allowing an operation to be performed on the subnet as part of a transaction, perform a consistency check on state information associated with one or more peer configuration daemons in the network environment;
replicate a configuration file to one or more peer configuration daemons, wherein the configuration file includes at least one management key (M_Key) value;
receive confirmation from the one or more peer configuration daemons that the replicating has successfully completed when the peer configuration daemons have received and stored the configuration file;
perform a consistency check on the configuration file received and stored at the one or more peer configuration daemons to determine that the configuration file received and stored at the one or more peer configuration daemons is consistent with the configuration file replicated via the master configuration daemon;
instruct, after the confirmation has been received and the consistency check has been performed, each of the one or more peer configuration daemons to make the stored configuration file available to its associated subnet manager (SM) on the switch; and
perform a commit operation by the master configuration daemon instructing each of the one or more peer configuration daemons to update its associated subnet manager with a list of M_Key values provided by the configuration file.

10. The system according to claim 9, wherein:
an order for replicating the configuration file to the one or more peer configuration daemons can be determined based on a type of a transaction.

11. The system according to claim 10, wherein:
the master configuration daemon operates to use the configuration file to first update one or more known lists of M_Key values on the master subnet manager, when the transaction is an add-only transaction.

12. The system according to claim 10, wherein:
the master configuration daemon operates to use the configuration file to first update one or more known lists of M_Key values on one or more subnet managers other than the master subnet manager, when the transaction is not an add-only transaction.

13. The system according to claim 9, wherein:
the one or more states include
availability of the one or more peer configuration daemons,
compatible implementation/protocol version,
correct current daemon run-time state, and
correct current configuration state/version on the one or more peer configuration daemons.

14. The system according to claim 9, wherein:
a consistent encryption password is verified for each configuration daemon prior to initiating a transaction.

15. The system according to claim 9, wherein:
an operation to change a new current M_Key value and an operation to delete an old current M_Key value is prohibited in a same transaction.

16. The system according to claim 9, wherein:
the master configuration daemon operates to ensure that the master subnet manager has a known M_Key list not shorter than any M_Key list maintained by the other subnet manager instance.

17. A non-transitory machine readable storage medium having instructions stored thereon that when executed cause a system to perform the steps comprising:
providing, at a plurality of switches in a network environment that includes a subnet, a plurality of subnet managers and configuration daemons, including, for each switch, a subnet manager and a configuration daemon that are associated with that switch,
wherein a master configuration daemon is an active configuration daemon on a switch with an associated master subnet manager also on that switch,
wherein the master configuration daemon communicates with peer configuration daemons within the subnet, and
wherein each switch provides a transactional interface that allows management of the subnet using one or more transactions;
prior to allowing an operation to be performed on the subnet as part of a transaction, performing, via the master configuration daemon, a consistency check on state information associated with one or more peer configuration daemons in the network environment;

replicating, via the master configuration daemon, a configuration file to the one or more peer configuration daemons, wherein the configuration file includes at least one management key (M_Key) value;

receiving, by the master configuration daemon, confirmation from the one or more peer configuration daemons that the replicating has successfully completed when the peer configuration daemons have received and stored the configuration file;

performing a consistency check on the configuration file received and stored at the one or more peer configuration daemons to determine that the configuration file received and stored at the one or more peer configuration daemons is consistent with the configuration file replicated via the master configuration daemon;

instructing, via the master configuration daemon, and after the master configuration daemon has received confirmation that the replicating has successfully completed and the consistency check has been performed, each of the one or more peer configuration daemons to make the stored configuration file available to its associated subnet manager (SM) on the switch; and performing a commit operation by the master configuration daemon instructing each of the one or more peer configuration daemons to update its associated subnet manager with a list of M_Key values provided by the configuration file.

* * * * *